United States Patent [19]

Gutterman

[11] 4,239,959
[45] Dec. 16, 1980

[54] PERPETUATION OF INFORMATION IN MAGNETICALLY RECORDED MEDIUM

[75] Inventor: Robert P. Gutterman, Bethesda, Md.

[73] Assignee: General Kinetics Incorporated, Rockville, Md.

[21] Appl. No.: 780,537

[22] Filed: Mar. 23, 1977

[51] Int. Cl.³ .................... G06K 19/06; G11B 5/02; G11B 5/74

[52] U.S. Cl. .................................. 235/493; 360/2; 360/56; 360/131

[58] Field of Search ............... 235/61.12 M, 61.11 D, 235/61.7 B; 360/2, 131, 60, 56; 340/149 A; 101/426; 346/74.1

[56] References Cited

U.S. PATENT DOCUMENTS

| | | | |
|---|---|---|---|
| 3,171,106 | 2/1965 | Lemmond | 360/56 |
| 3,566,356 | 2/1971 | Holm | 235/61.12 M |
| 3,788,617 | 1/1974 | Barney | 235/61.11 D |
| 3,878,367 | 4/1975 | Fayling | 235/61.12 M |
| 3,883,892 | 5/1975 | Kneller | 360/131 |
| 3,927,393 | 12/1975 | Fayling | 360/56 |
| 3,986,205 | 10/1976 | Fayling | 360/2 |
| 3,998,160 | 12/1976 | Pearce | 101/426 |
| 4,023,204 | 5/1977 | Lee | 360/56 |

*Primary Examiner*—Robert M. Kilgore
*Attorney, Agent, or Firm*—Cushman, Darby & Cushman

[57] ABSTRACT

A uniformly distributed magnetic recording medium is carried on or in an initially fluidizable support. During or after magnetically writing information upon the medium, the support is changed to a fluidized state, sufficient to permit some physical translational movement of the medium in localized areas corresponding in pattern to characteristic magnetic non-uniformities caused in medium by the magnetic writing. The support is then set or otherwise converted to a state in which such movement is no longer possible. Thereafter, even if the medium is degaussed, the now set non-uniformities in physical distribution of the recording medium, will permit the information that had been magnetically written, to continue to be read e.g. by magnetic analysis of the medium.

10 Claims, 4 Drawing Figures

MAGNETIC MATERIAL CONCENTRATION AND MAGNETIC ORIENTATION AFTER TEMPORARY FLUIDIZATION, "FREEZING" AND SUBSEQUENT UNIDIRECTIONAL MAGNETIC SATURATION.

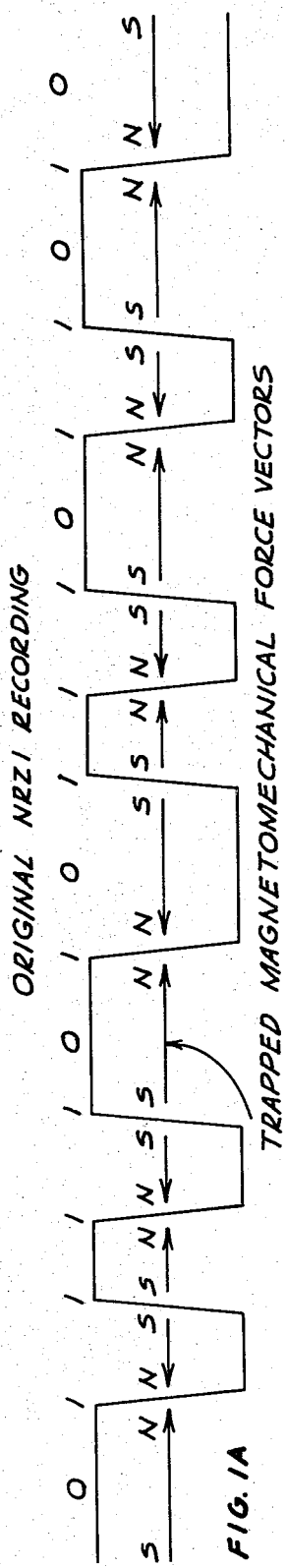
FIG. 1A — ORIGINAL NRZI RECORDING / TRAPPED MAGNETOMECHANICAL FORCE VECTORS
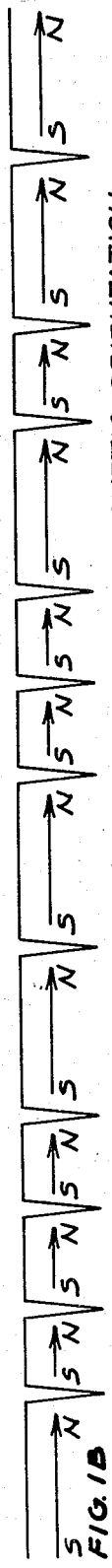
FIG. 1B — MAGNETIC MATERIAL CONCENTRATION AND MAGNETIC ORIENTATION AFTER TEMPORARY FLUIDIZATION, "FREEZING" AND SUBSEQUENT UNIDIRECTIONAL MAGNETIC SATURATION.
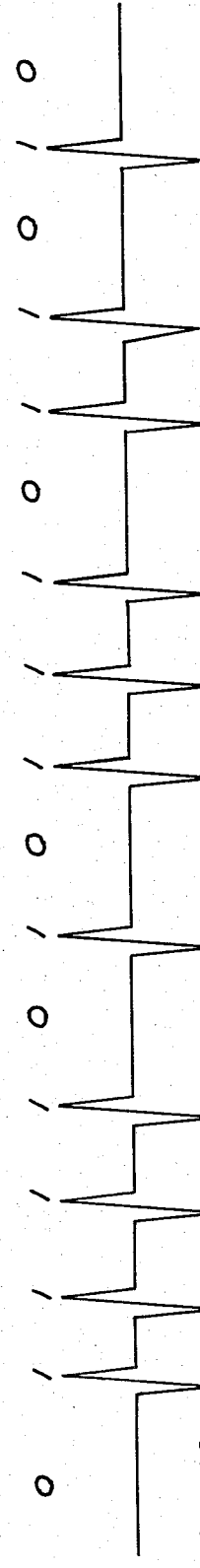
FIG. 1C — FINAL PLAYBACK OUTPUT
FIG. 1D — REFERENCE CLOCK

PERPETUATION OF INFORMATION IN MAGNETICALLY RECORDED MEDIUM

BACKGROUND OF THE INVENTION

Various surveys and experimental work have been conducted by the present inventor, and possibly others, of ways and means for "freezing" magnetically recorded data in order both to preserve the data from accidental erasure and to maintain security of the data against deliberate attack or unauthorized modification. Much of such surveying and experimental work previously has been concentrated on the protection of magnetic data recording tapes.

Accordingly, the present inventor is aware of past proposals employing direction-controlled or modulated electron beams, lasers or other sources of radiant-beam energy to cause irreversible local destruction or modification of a magnetic track under computer control to produce magnetically recognizable trains of data pulses. The equipment required to practice such methods is costly and complex. The present inventor also is aware of the possibility of simply printing separated magnetic ink marks in one of the more or less standard magnetic data recording patterns. While a method of this type may be more attractive than the use of an electron beam, laser or similar technique, the same comments apply as to cost and complexity, particularly in respect to equipment adjustment and maintenance.

Simple mechanical embossing of a magnetic surface may be performed at relatively low speeds by selectively driving a small impact tool into the magnetic coating in accord with a computer-programmed pattern.

There exists a proposal to modify the content of passports issued by the United States, and by other countries.

According to that proposal the new passport, measuring approximately 88 mm by 125 mm, is to remain in book form. An unalterable magnetic zone is to be located either on an inside cover of the passport or on the reverse of an insert data page laminated in the passport book. The data to be encoded and later made permanent in the magnetic zone will correspond with that in the accompanying clear print and will consist of about 92 alphanumeric characters.

It is presently intended, although not certain, that in the United States the blank passport book will be printed by the Government Printing Office and delivered later to the Passport Office. If possible, it is desired that the new magnetic stripe or zone, in blank form, will be printed in the book at the time of its manufacture. At the time of issuance, the Passport Office will incorporate the bearer's personal data and photograph into the book. At the same time the new magnetic zone will be encoded automatically with the same or related data. This will be performed by entering the data into a computer, reformatting the data in the computer and causing the computer both to print the data in the passport and to output the same data to a magnetic encoding station which will encode the passport's magnetic zone. The procedures involved in producing the blank passport, later encoding (and proofreading) the magnetic zone and final "freezing" of the recorded data must be economically practical. It is especially essential that the reproduction device used to read the magnetically coded data shall be of low cost and simple design to enable easy and rapid machine reading at the automatic reading terminal.

There is a requirement that the minimum life expectancy of the "frozen" magnetic zone be 8 years. It should be noted that this life expectancy is comparable with existing ordinary magnetic recording materials and procedures.

It is also a requirement that the passport magnetic encoding be reliably readable at temperatures from $-10°$ C. to $+50°$ C. It is further required that the final form of the magnetically encoded passport withstand storage temperatures between $-35°$ C. and $+80°$ C., without degradation of performance. While this latter requirement is not always met by magnetic recording materials now in common use, it is possible to achieve the storage and reading temperature requirements by a judicious choice of the substrate material as well as the magnetically active zone.

Together with the above temperature survival requirements, the passport and its magnetic encoding is to remain reliably readable at relative air humidities between 5% and 95% with a maximum wet-bulb temperature of 25° C. For storage, the required humidity excursion may be extended between the ranges of 0% and 100% without degradation of performance. Again, while many common magnetic recording media may experience difficulty in withstanding extended storage over the stated combined temperature and humidity ranges, this difficulty can be overcome reliably through appropriate choice of the materials of both the magnetic zone and its substrate.

SUMMARY OF THE INVENTION

It is an objective of the invention to provide a magnetic zone and a method for recording thereon, so that the information, once recorded, can be "frozen" i.e. made permanent, immutable and unalterable so that it cannot be erased or modified in any way short of easily recognizable permanent destruction.

A uniformly distributed magnetic recording medium is carried on or in an initially fluidizable support. During or after magnetically writing information upon the medium, the support is changed to a fluidized state, sufficient to permit some physical translational movement of the medium in localized areas corresponding in pattern to characteristic magnetic non-uniformities caused in medium by the magnetic writing. The support is then set or otherwise converted to a state in which such movement is no longer possible. Thereafter, even if the medium is degaussed, the now set non-uniformities in physical distribution of the recording medium, will permit the information that had been magnetically written, to continue to be read, e.g. by magnetic analysis of the medium.

One immediately forseeable application of the method is for the production of a passport bearing a magnetic zone permanently encoded with data relating to the passport holder.

Upon a moment's reflection, it will be clear that the same ways and means and inventive principles used to provide such a passport, can be used in the field of identification, generally. For instance, the invention is applicable to the provision of more secure credit cards, identification cards, pass cards, transaction approval cards, and in general, to most if not all instances where there is a need to record information magnetically, then ensure it remains unaltered.

The principles of the invention will be further discussed with reference to the drawing wherein preferred embodiments are shown. The specifics illustrated in the drawing are intended to exemplify, rather than limit, aspects of the invention as defined in the claims.

BRIEF DESCRIPTION OF THE DRAWING

In the Drawing

FIG. 1A is a schematic representation of magnetically recorded data, prior to perpetuation thereof;

FIG. 1B is a schematic representation of the same data, after perpetuation thereof;

FIG. 1C is a schematic representation of the results of reading the data in perpetuated form; and FIG. 1D is a schematic representation of a recorded clock reference signal in registry with FIGS. 1A-1C.

DETAILED DESCRIPTION

In practicing the present invention conveniently, one can use as a recording medium a dispersion of the gamma-ferric oxide powder most commonly used in ordinary magnetic data recording systems. It is also possible to use mixtures of ferric oxide and chromic oxide and/or other ferromagnetic powders, with or without an anti-friction component.

The required magnetic data zone preferably is to be applied by printing on a page, card, tape or other support. The selected ferromagnetic powder may be dispersed in a dryable fluid medium suitable for the creation of an ink-like mixture capable of being applied and fixed to surfaces by more or less standard printing or other surface coating methods.

The dispersing medium must have certain special characteristics essential to the magnetic "freezing" method as well as the ability to perform properly as an "ink" base. In order to optimize the magnetic "freezing" characteristics for each practical application, the dispersing medium must be very carefully chosen. The medium chosen must have the capability to adhere to both the dispersed magnetic particles and the supporting surface. While the material could be dried to form a solid, magnetically-recordable sheet for later lamination or bonding to the final support surface, this added complexity at present does not seem to be generally necessary. Direct application of the magnetic dispersion to the permanent substrate material by printing methods presently appears to be practical and economically desirable.

The special dispersing medium may be chosen from one of several available families of "plastic" media. While it must be capable of initial solidification to form a durable, recordable magnetic stripe or zone, the applied magnetic dispersion must initially retain or be capable of being returned to at least a partially fluid state at a time following application of the magnetically recorded data. Returning the material to a fluid state can be done through the brief application of controlled heat, by exposure to a solvent or by a combination of these steps. After being recorded and later briefly fluidized, the dispersing material must be capable of being returned again to the solid state and/or finally converted to a dry, solid structure which can no longer ever be converted to a fluid through the application of heat, solvents, or any non-destructive method. This final conversion of the magnetically recorded medium to an irreversible "frozen" solid is essential to completion of the magnetic data "freezing" process.

Following the practice described above, FIGS. 1A-1D illustrate schematically the manner in which magnetic "freezing" of the recorded data is accomplished. After the coating has been applied to its substrate it preferably forms a dry and relatively durable magnetic recording surface while remaining in what is generally referred to as a "thermoplastic" state. While the recording medium is in this solid, thermoplastic state, the required data are recorded by entirely common methods. FIG. 1A illustrates the presently preferred recording method. This is the so-called NRZI recording method used almost universally for magnetic recording in the data processing industry. In this recording process the magnetic material is subjected to magnetic saturation either in a positive (north-south) or negative (south-north) condition parallel to the direction of the recording sequence. The representation of a "1" is accomplished by merely changing the direction of saturation of the recording medium at a location determined by a standard reference "clocking" procedure. Representation of a "0" is accomplished by merely omitting to change the direction of magnetization at any chosen "clock"-pulse position. FIG. 1A illustrates a train of data pulses recorded in this fashion.

After a train of data pulses has been recorded by the NRZI method, the magnetic particles contained within the coating become subject to substantial magnetomechanical replusion forces narrowly concentrated in each transition region used to represent a "1" character. While the existence of these magnetomechanical forces has no useful effect in ordinary magnetic recording procedures, it can be used as the basis for a data "freezing" process.

As stated above, the entire body of the magnetic zone coating containing the NRZI-recorded data and the resulting trapped magnetomechanical forces can be returned to an essentially fluid condition. When this has been accomplished the suspended and magnetized magnetic particles contained within the coating become free to move. Motion therefore takes place, primarily in response to the previously trapped magnetomechanical repulsion forces existing at the location of each change in direction of magnetic saturation originally applied to represent a "1" character. Since the magnetomechanical forces at each position of reversed magnetic saturation are forces of mutual repulsion, the magnetically recorded and later temporarily fluidized recording medium experiences a reduction in the concentration of magnetic particles per unit volume in areas narrowly confined to the saturation reversal regions. The degree of flow and particle separation thus achieved depends on the specific magnetic characteristics of the suspended particles, the viscosity of the temporarily fluidized coating, the length of time during which the magnetic coating is maintained in the fluid state and the presence of any mechanical vibration of the material. The relative concentration of the magnetic particles resulting from fluidizing the recorded pattern of FIG. 1A is represented schematically in FIG. 1B. "Freezing" of the original magnetic recording at this point in the procedure is simply accomplished by converting the coating to a solid state and treating the coating so as to prevent any later reconversion to a fluid condition.

After "freezing" has been accomplished in the manner described above, the original magnetic recording may be erased (degaussed) by any one of the usual methods for removing magnetic recordings from ordinary recording media. If a gradually-decreasing alternating magnetic field is applied to the coating, essentially all of the original magnetized pattern can be erased and any attempt to reproduce the original data by ordinary means will produce no useful output from the magnetic reproducing head. However, if the "frozen" tape is merely subjected to a longitudinal saturating field in either of the two possible directions parallel to the original recording direction, a series of new magnetized areas separated by the areas of permanent low magnetic material concentration will reappear as a strong, magnetically readable pattern. No matter how many times the "frozen" recorded pattern is magnetically erased, it can always be made to reappear in its original form by merely "wiping" the magnetic coating with a permanent magnet (or direct-current electromagnet) of strength sufficient to reduce remagnetization of the magnetic particles. It is preferable that such remagnetization be performed at the saturation level. Thus, any attempt to modify the permanent original data or to add additional data by standard recording means is doomed to failure. While the magnetic coating in its final, "frozen" form will still remain capable of being remagnetized in a new data pattern, such remagnetization will be removed entirely by the act of "wiping" the recording surface with a strong (saturating) permanent magnet, leaving only the original "frozen" recording in readable condition.

Thus, both the simplest and most secure data reproduction procedure for utilization of the original "frozen" data consists merely of "wiping" the surface of the magnetic data zone with a permanent magnet and subsequently scanning the same zone with a magnetic reproduction head of standard and convenient type. FIG. 1C illustrates the voltage output waveform that will be produced during reproduction of a data recording "frozen" in the manner stated. Obviously, the original pattern of 1's and 0's always will correspond exactly with the pattern recorded prior to fluidization and later permanent solidification of the magnetic data zone.

The reference clock data shown schematically in FIG. 1D conveniently may be recorded and "frozen" at the time the original data are recorded.

It is obvious that the permanency and security of data records made and "frozen" in the manner described above illustrated in FIGS. 1A-1D is of a very high order and that any non-destructive attempt to modify, erase or add to the original data pattern will be most inordinately difficult. The perpetuated recording by use of the present invention is totally secure against accidental or deliberate magnetic erasure even if the recorded system is exposed to any magnetic experience that would be destructive to recordings made by ordinary methods.

It appears conceivable that certain special requirements may exist where a portion of magnetically recorded zone may conveniently be reserved for the recording of certain data which must be capable of subsequent modification and/or erasure. Since the finally-"frozen" recording material described above always will remain temporarily recordable in the usual sense, at least in those areas of the zone where no data were recorded prior to "freezing", such a potential requirement for the simultaneous availability of both "frozen" and alterable data can be met easily.

It is obvious that the degree of success achievable in practicing the invention depends on the proper choice of the "plastic" dispersing medium used in forming the magnetic recording surface. A substantial number of alternative materials having the necessary characteristics are known to exist. One typical material is the automotive body finishing paint formulation known as the "sand and bake" type. In this material automotive paint is applied in relatively rough fashion, allowed to dry, sanded to remove small local defects and finally subjected to a curing cycle in which the paint first becomes a fluid and later irreversibly cures to a finished and heat-polished condition. Coatings of this type have been based on certain modified cellulose derivatives and on the alkyd plastics. In the food industry, lithographed printed matter and background colors are applied to tin plate destined for use in food canning. The plastic dispersing materials used in these inks are usually of the polyester family. They can be formulated to produce a temporarily dryable liquid ink which subsequently is made insoluble by the application of ultraviolet light. Other types of radiant energy may be used as well. This class of materials has potential use in practicing the present invention.

Various techniques are known in the art for causing a usually heat-softenable, thermoplastic resin to undergo such cross-linking that it is no longer heat softenable. For instance, a peroxide may be incorporated in thermoplastic such as a polyester. So long as the polyester is not heated to a certain threshold temperature, the peroxide will remain dormant. However if the polyester is heated sufficiently, the peroxide will decompose and cure the polyester to a cross-linked, non-heat softenable state. Similarly, some plastics will remain heat softenable until they have been exposed to a certain amount of ultra-violet radiation, whereupon they take a set. The U.S. Pat. of Rainer et al. No. 2,877,500, issued Mar. 17, 1959 describes a process for producing blow-molded polyethylene bottles. Initially, the polymer is heat softenable and if stretched will shrink, but upon being formed into a bottle and irradiated, the polymer cures and takes a permanent set.

Many articles in *Encyclopedia of Polymer Science and Technology,* Interscience Publishers (1972), discuss ways and means for curing and setting initially heat-softenable plastic polymers.

A typically useful method for encoding the information for magnetic recording upon the zone, is to employ a modification of the widely-used American Standard Code for Information Interchange. In the modified form, the usual seven tracks of the standard binary coded decimal system, including an even parity check bit for each character, is augmented by two flanking tracks having identical reference clock pulse recordings. That establishes redundant clocking to minimize any errors in reading that might be caused by mechanical skewing between the reproduction head system and the scanned document.

One should not assume when reading this document that the primary usefulness of the invention is in the field of government-issued passports or other government-issued personal identity documents for, at present, the largest potential market is in the field of credit theft-prevention and fraud-prevention. Thus, the invention is significant for E.F.T. (electronic funds transfer) cards, commercial and financial credit cards, card-actuated building and restricted-area access control systems, and the like. Note that use is not limiting to providing preserved zones on still cards; indeed, the invention may be used in connection with magnetic recording tape, prerecorded video disks, machine control cards such as those used with "automatic" typewriters, belts, disks, chips and other magnetic recording media types and formats.

An anecdotal case is given to illustrate utility in the credit card field: There are reported instances where a person has innocently put his or her credit card, bearing a conventional strip of magnetically encoded information, in the same pocket or purse with a magnetized object, e.g. a magnetic key chain. The magnetized object scrambles, garbles or obliterates the encoded information, causing invisible destruction of the card and leading to embarassment or worse next time an attempt is made to use the card. If, instead, those persons had cards produced in accordance with the present invention, and the issuers thereof used systems which involved resaturating each permanently recorded card upon each use thereof prior to reading it, such magnetic accidents as now are caused by magnetic key chains and the like would be past history.

It should now be apparent that the perpetuation of information in magnetically recorded medium as described hereinabove, possesses each of the attributes set forth in the specification under the heading "Summary of the Invention" hereinbefore. Because it can be modified to some extent without departing from the principles thereof as they have been outlined and explained in this specification, the present invention should be understood as encompassing all such modifications as are within the spirit and scope of the following claims.

What is claimed is:

1. A method for perpetuating information in a magnetically recorded medium, in which a support bearing a zone of ferromagnetic particles substantially homogeneously distributed in a layer of substantially uniform thickness, firm, softenable plastic carrier has been written upon with a series of spatially discrete magnetic pulses, said method comprising:
  (a) softening the plastic carrier sufficiently to permit relative translational movement of said particles, whereby relative translational movement will occur due to magnetic forces among the particles, causing local non-uniformities in the homogeneity of distribution of said particles, in a pattern which mimics in said zone said series of spatially discrete magnetic pulses; and
  (b) hardening and irreversibly setting the plastic carrier to preserve said pattern,
    whereby, even if said zone were to be degaussed, the information that was recorded in a series of spatially discrete magnetic pulses can thereafter be retrieved at will, by remagnetizing the zone and magnetically reading said pattern of local non-uniformities.

2. A method for perpetuating information in a magnetically recorded medium, comprising:
  (a) providing a support bearing a zone of ferromagnetic particles substantially homogeneously distributed in a layer of substantially uniform thickness, firm, softenable plastic carrier which has been written upon with a series of spatially discrete magnetic pulses,
  (b) softening the plastic carrier sufficiently to permit relative translational movement of said particles, whereby relative translational movement will occur due to magnetic forces among the particles, causing local non-uniformities in the homeneity of distribution of said particles, in a pattern which mimics in said zone said series of spatially discrete magnetic pulses; and
  (c) hardening and irreversibly setting the plastic carrier to preserve said pattern,
    whereby, even if said zone were to be degaussed, the information that was recorded in the series of spatially discrete magnetic pulses can thereafter be retrieved at will, by remagnetizing the zone and magnetically reading said pattern of local non-uniformities.

3. The method of claim 2 wherein:
step (a) comprises providing a passport page bearing said zone, said zone being less extensive than said page but being sufficiently extensive as to have room to contain said series of spatially discrete magnetic pulses, encoded information that equates to the identity of the respective passport holder, the identity of the respective passport-issuing entity and the identity of the respective passport.

4. The method of claim 2 wherein:
the firm, softenable plastic carrier of step (a) is a polymeric thermoplastic material; and
the setting of step (c) is effected by generating cross-links among molecules of said material.

5. A method for generating a magnetic stencil, useful for making analogs of the stencil, comprising:
  (a) magnetically writing on a zone of ferromagnetic particles homogeneously distributed in a uniformly distributed layer of largely uncured, somewhat fluid plastic material,
  (b) permitting the said particles written upon and not written upon to move translationally in said layer relative to one another in tending to reduce magnetic force concentrations induced in said zone ancillary to conducting step (a); and
  (c) substantially curing said plastic material to preserve a set condition wherein the particle movement of step (b) has produced a physical analog of the magnetic writing of step (a), in order to thereby create of said zone a magnetic stencil which, even if degaussed, will, when remagnetized be magnetically readable due to the set movement of the ferromagnetic particles into localized areas of greater and lesser concentration which analog the magnetic writing of step (a).

6. The method of claim 5, further comprising:
  (d) magnetically writing on said zone, subsequent to conducting step (c), in order to also provide in said zone a field of erasably stored data.

7. The method of claim 5 wherein movement of said particles in step (b) is aided by mechanically vibrating said layer.

8. A magnetic stencil produced by the process of claim 5.

9. A support bearing an irreversibly set pattern of perpetuated information produced by the process of claim 1.

10. A support bearing an irreversibly set pattern of perpetuated information produced by the process of claim 2.

* * * * *

UNITED STATES PATENT AND TRADEMARK OFFICE
CERTIFICATE OF CORRECTION

PATENT NO. : 4,239,959
DATED : December 16, 1980
INVENTOR(S) : Robert P. Gutterman It is certified that error appears in the above—identified patent and that said Letters Patent is hereby corrected as shown below:

Column 5, line 16, delete "reduce" and insert --produce--.

Signed and Sealed this

Tenth Day of March 1981

[SEAL]

Attest:

RENE D. TEGTMEYER

*Attesting Officer*    *Acting Commissioner of Patents and Trademarks*